United States Patent [19]

Allred

[11] Patent Number: 5,221,508

[45] Date of Patent: Jun. 22, 1993

[54] METHOD OF FELTING OPEN CELL POLYCHLOROPRENE LATEX FOAM IN REDUCED TIME

[75] Inventor: Donald R. Allred, Brookfield, Conn.

[73] Assignee: Pitney Bowes Inc., Stamford, Conn.

[21] Appl. No.: 797,677

[22] Filed: Nov. 25, 1991

[51] Int. Cl.$^5$ ............................................. B29C 67/20
[52] U.S. Cl. ..................................... 264/321; 264/320
[58] Field of Search ................ 264/321, 320; 118/264; 101/333, 401.1

[56] References Cited

U.S. PATENT DOCUMENTS

| | | | |
|---|---|---|---|
| 1,877,527 | 9/1932 | Moran | 264/321 |
| 1,993,278 | 3/1935 | Murphy et al. | 264/321 |
| 2,071,647 | 2/1937 | Miller | 264/321 |
| 2,327,001 | 8/1943 | Schott | 264/321 |
| 2,575,259 | 11/1951 | Cox et al. | 264/321 |
| 2,680,140 | 6/1954 | Carter | 264/321 |
| 3,281,258 | 10/1966 | Callahan | 264/321 |
| 3,506,749 | 4/1970 | Weissman | 264/321 |
| 3,523,966 | 8/1970 | Kordiak | 264/321 |
| 5,104,908 | 4/1992 | Allred et al. | 521/150 |
| 5,132,170 | 7/1992 | Terry | 428/315.5 |

FOREIGN PATENT DOCUMENTS 6515960  6/1967  Netherlands .................. 264/321

*Primary Examiner*—Allan R. Kuhns
*Attorney, Agent, or Firm*—Peter Vrahotes; Melvin J. Scolnick

[57] ABSTRACT

A method of felting an open cell polychloroprene latex foam layer to obtain desired properties. Such felting renders the finished foam suitable for controlled ink flow required for printing purposes. The felting is accomplished by reducing the volume of the foam and simultaneously heating at a temperature of 420° to 480° F. for one half to two minutes, releasing the pressure for ten seconds to one minute and reapplying the pressure for an additional one half to two minutes.

5 Claims, No Drawings

METHOD OF FELTING OPEN CELL POLYCHLOROPRENE LATEX FOAM IN REDUCED TIME

COPENDING APPLICATIONS

Attention is directed to concurrently filed patent applications entitled Rechargeable Inking Pad, Ser. No. 07/797,579, now U.S. Pat. No. 5,132,170, and Method of Producing a Felted Open Cell Polychloroprene Latex Foam, Ser. No. 07/797,676, filed Nov. 25, 1991, both by Betty R. Terry, and Method of Shaping and Felting Open Cell Polychloroprene Latex Foam, Ser. No. 07/797,679, now U.S. Pat. No. 5,104,908, by Donald R. Allred and William Moller.

BACKGROUND OF THE INVENTION

In the printing industry, there are generally two types of inks, dispersion inks and solution inks. Dispersion inks have been widely used throughout the years because they more easily can be formulated. The primary disadvantage of dispersion inks is that their components tend to settle and, as a result, the inks must be agitated on occasion. Although solution inks do not have a settling problem, they are more difficult to produce. Recently, strides have been made in the capability of producing solution inks, but such inks have been found to be incompatible with contemporary systems that are used to apply inks. For example, in the printhead of a postage meter, an inking pad, or roller, hereafter collectively referred to as inking member, will contact the printhead to transfer ink thereto and the inking member will be removed from the printhead so that the inked print head can contact a mailpiece to print an indicia.

In developing solution inks, it has been found that inking members that are acceptable for use with dispersion inks simply are not efficient when used with solution inks. This is because inking members suitable for dispersion inks have pores that are too large. Such large pore sizes are required to allow dispersed particles to be distributed through the inking member. Additionally, typical inking members for dispersion inks were found to be incompatible with polyglycols, a component of contemporary solution inks. Consequently, it has become evident that if the benefits offered by solution inks are to be realized, inking members must be developed that will enhance the use of such inks.

In copending applications Rechargeable Inking Pad and Method of Producing a Felted Polychloroprene Foam and Method of Shaping and Felting Polychloroprene Latex Foam, a method is disclosed wherein foam made of polychloroprene can be felted. This had heretofore been considered an unobtainable goal because of the resiliency and lack of compression set of polychloroprene. Although the method proved satisfactory, it became evident that a reduced felting time and greater tolerance of incoming lot variations would be desirable.

SUMMARY OF THE INVENTION

Open cell polychloroprene latex foam can be compression molded to tight tolerances by combining stress-relaxation cycles with heat. This is accomplished by placing a pre-cut open cell polychloroprene latex foam in a mold, compressing and applying heat. The compression/heat cycle is interrupted for a small period, then another compression/heating cycle is applied. This method greatly reduces time in the mold, and significantly reduce costs, and results in a more constant result in terms of quality.

DETAILED DESCRIPTION OF THE PREFERRED EMBODIMENT

The typical process used to make slabs of open cell polychloroprene foam is referred to as the Dunlop process. Fundamentally, the latex material is an unvulcanized polymer which is dispersed in aqueous media. This material is mixed with Zinc Oxide, carbon black (if desired), fatty acid latex stabilizers, and other performance specific additives. At this point the latex mixture is pumped through pipes to the foaming head. The latex material is highly basic (pH about 12). A gelling agent, such as sodium silicofluoride is added just as the latex approaches the mixing head. This mix is whipped via mechanical means, producing a foam. As the foam travels down exit piping, the pH drops due to the decomposition of the gelling agent. The foam is poured into a large pan, much like baking a cake; the foam is nearly fully gelled at this point. The gelled foam is set under an IR heat lamp to insure full gellation. The pans are typically 4 ft. by 12 ft. by 2 to 6 inches thick. The pan size is limited by the foaming efficiency of the mixing head, and the stability of the gelled foam. This gel time is usually 2.5 to 4 minutes.

After gelling, the foam is placed into a steam autoclave and vulcanized at about 80 psi. The 80 psi steam reaches 154° C. (312° F.). Steam is preferred for curing foams over dry heat due to the larger heat capacity and thermal transfer of the high pressure steam. After all, a foam is a very good thermal insulator. The time for full vulcanization at this temperature is about 60 minutes.

After curing, the foam is washed to remove foam stabilizers and residual latex surfactants. The washing consists of soaking in cool water and ringing out the water, much like the circa 1930 washer. The washed buns are then placed in a dry heat oven (235° F.) for 12 to 24 hours to provide a dry foam for fabrication.

It is well known that open cell latex polychloroprene foam has appreciable elastic recovery attributes. For this reason is selected as a material for ink pads and because it can withstand repeated flexing with very little compression set. It has been found, however, at elevated temperatures (about 420° F. to 480° F.) the material can be forced to have a permanent set, in a process called felting. During the felting compression step, the elastameric chains of the polychloroprene molecules shift and slide past one another. The elevated temperature serves to weaken the crosslink bonds between neighboring molecules. The crosslink bonds eventually break and reform between new sites, providing elastic behavior to the felted foam.

It has been found that repeated compressions achieves more complete felting as compared to single cycle compression. The time delay between the end of one cycle and the beginning of the next must be less than the time required for the open cell latex polychloroprene foam to achieve full elastic recovery from the compression. A period of ¼ sec to 2 min is recommended. Open cell polychloroprene latex foam typically requires about 1 to 4 hours to fully recover from a hot compression. These repetitive strains serve to enhance the breaking and reformation of the crosslink bonds described. This action is repeated until no additional strain is added to the compressed foam and it has conformed to the dimensions of the compression mold cavity.

EXAMPLE I

A piece of open cell polychloroprene latex foam (1"×2"×0.335" thick) can be felted by heating and compressing the foam into a 0.185" deep cavity. By maintaining a temperature of 460° F., the material need be compressed for about 8 minutes to obtain a final thickness of 0.185. It has been found that by adding the cyclical stress-relaxation step, significant time benefits are observed. These same sized open cell polychloroprene latex foam samples can be fully felted to 0.185" in two stress-relaxation cycles, of two minutes hold time each, giving a total hot compressions time of 4 minutes. Furthermore, this same degree of felting can be achieved by using 4 stress-relaxation cycles of 30 second hold time each, for a total hot compression hold time of only 2 minutes.

EXAMPLE II

As a further example, a piece of open cell polychloroprene latex foam (1"×2"×0.335" thick) can be felted by heating and compressing the foam into a 0.155" deep cavity. By maintaining a temperature of 460° F., the material needs to be compressed for longer than 8 minutes to obtain a final thickness of 0.155. That is to say full felting was not achieved in 8 minutes. However, by adding the cyclical stress-relaxation step, significant time benefits are again observed. These same sized open cell polychloroprene latex foam samples can be fully felted to 0.155" to 2 stress-relaxation cycles (of 2 minutes each), giving a total hot compressions time of 4 minutes. Furthermore, this same degree of felting can be achieved by again using 4 stress-relaxation cycles of 30 second hold time each, for a total hot compression hold time of only 2 minutes.

What has been determined, is that the benefit from additional cycles plateaus rapidly within a few cycles. Thus using 2 or 3 cycles over a one to four minute dwell times will provide tight tolerance of parts from significant lot to lot variations and reduce the time required to achieve felting of the open cell polychloroprene latex foam.

The benefits of "cycle felting" are:
1. Lower dwell time in the mold.
2. Lower net cost.
3. Greater tolerance of incoming lot variations.

What is claimed is:

1. A method of felting open cell polychloroprene latex foam, the steps comprising:
   a) placing a quantity of open cell polychloroprene latex foam in a mold,
   b) applying pressure to the open cell polychloroprene latex foam to compress the same,
   c) heating the polychloroprene foam to a temperature of 420° F. to 480° F.,
   d) maintaining the pressure for one half minute to two minutes,
   e) releasing the pressure applied to the open cell polychloroprene latex foam for a period of ten seconds to two minutes,
   f) reapplying said pressure for another period of one half to four minutes, and
   g) releasing said pressure and terminating said heating.

2. The method of claim 1 wherein step b includes reducing the volume of said polychloroprene by one half.

3. The method of claim 1 wherein steps c and d include applying pressure for two minutes.

4. The method of claim 1 wherein step b and step c are taken simultaneously.

5. The method of claim 4 wherein step e and step f are repeated four times for a period of one half to one minute and ten seconds to one minute, respectively.

* * * * *